United States Patent [19]

Furukawa

[11] Patent Number: 5,643,082

[45] Date of Patent: Jul. 1, 1997

[54] COOL AIR STREAM GENERATING APPARATUS

[75] Inventor: Seizo Furukawa, Hyuga, Japan

[73] Assignee: Kabushiki Kaisha Tsunetome-Dengyo, Japan

[21] Appl. No.: 584,527

[22] Filed: Jan. 11, 1996

Related U.S. Application Data

[63] Continuation-in-part of Ser. No. 286,687, Aug. 5, 1994, abandoned.

[51] Int. Cl.$^6$ ........................................ F24F 6/14
[52] U.S. Cl. ............................... 454/337; 454/223
[58] Field of Search .......................... 454/223, 337

[56] References Cited

U.S. PATENT DOCUMENTS

| | | | |
|---|---|---|---|
| 1,717,005 | 6/1929 | Carrier | 454/337 X |
| 2,450,571 | 10/1948 | Bahnson | 454/337 |
| 5,146,762 | 9/1992 | Atkins | 454/337 |

FOREIGN PATENT DOCUMENTS

| | | | |
|---|---|---|---|
| 1002415 | 3/1952 | France | 454/337 |
| 281007 | 7/1934 | Italy | 454/337 |
| 61-295447 | 12/1986 | Japan | 454/337 |
| 815318 | 3/1981 | U.S.S.R. | 454/337 |

*Primary Examiner*—Harold Joyce
*Attorney, Agent, or Firm*—Graham & James LLP

[57] ABSTRACT

A water delivering tube having a spray nozzle secured to the front side thereof is detachably disposed in front of a blower so as to eject water therefrom in the form of mist particles. To feed pressurized water to the water delivering tube, a water feeding tube is connected to the water delivering tube. As the blower is rotated, an environmental air is introduced into the interior of a building to be cooled, and subsequently, it is mixed with the mist particles which in turn are vaporized by the latent heat of the mist particles appearing as the foregoing vaporization proceeds. Thus, a large quantity of warm air in the environmental air in the interior of the building can quickly be cooled without any necessity for carrying out heat exchanging.

9 Claims, 2 Drawing Sheets

COOL AIR STREAM GENERATING APPARATUS

RELATED APPLICATION

This application is a continuation-in-part of U.S. Ser. No. 08/286,687 filed Aug. 5, 1994, abandoned.

BACKGROUND OF THE INVENTION

1. Field of the Invention

The present invention relates to a cool air stream generating apparatus which assures that a large quantity of warm air can quickly be cooled without any necessity for carrying out heat exchanging between a coolant and a so-called cooling unit substantially composed of an evaporator and a condenser.

2. Description of the Related art

As is well known, to cool warm air and then deliver the air having a reduced temperature to a room or a chamber to be cooled, an air conditioner has been hitherto usually used to serve as a cooling unit.

To construct a cooling unit more simply for the purpose of fabricating it at an inexpensive cost and operating it at a low running cost, various proposals have been hitherto made for providing an inexpensive cooling unit. One of the proposals is such that a cloth having air permeability is extensively suspended in front of a blower at a right angle relative to the direction of air blowing and cold water is continuously fed to the cloth so as to allow it to be always wetted with the cold water. As the air delivered from the blower permeates through the wetted cloth, it is cooled by the cold water. Another proposal is such that a water curtain composed of a large number of water droplets is suspended in place of the foregoing cloth always wetted with cold water.

Generally, a live-stock breeding farm such as a chicken farm, a pig farm, a cow farm or the like as well as a plant growing farm such as a so-called vinyl house or the like have a large volumetric capacity, and moreover, exhibit poor sealability, respectively. Thus, to cool the interior of a house of the foregoing type by operating an air conditioner to reduce the temperature of the same, a large size of expensive air conditioner should be installed in the house, causing it to be operated at a remarkably high running cost.

In the case that the cooling unit is constructed in the form of a wetted cloth suspended in front of a blower, it is not suitably employable for constructing it on a large scale, and moreover, the air cooled by it can be blown only within the range of a short distance.

On the other hand, in the case that the cooling unit is constructed in the form of a water curtain composed of a large number of water droplets, the structural scale of the cooling unit is unavoidably enlarged, resulting in a quantity of energy consumed for operating it being undesirably increased.

In the aforementioned two cases, to cool warm air delivered from the blower, heat exchanging is carried out between the warm air and the cooling water. However, this type of cooling unit exhibits a low cool air generating efficiency in spite of a large quantity of energy and water consumed for operating the cooling unit. Although a part of the cooling water is vaporized to extract heat from the air stream discharged from the cooling unit, the resultant cooling effect is unexpectedly very low compared with that obtainable by heat exchanging between the cooling water and the air stream.

In addition, in the aforementioned two cases, since the temperature of the cooled air stream prepared in that way is considerably elevated, there does arises an occasion that this type cooling unit can not practically be employed depending on an application field thereof. Another problem is that when the cooled air stream collides with an operator, he does not always comfortably feel the collision of the cooled air stream.

SUMMARY OF THE INVENTION

The present invention has been made in consideration of the aforementioned background.

An object of the present invention is to provide a cool air stream generating apparatus which assures that a large quantity of warm air can quickly be cooled without any necessity for carrying out heat exchanging between a coolant and a cooling unit.

Another object of the present invention is to provide a cool air stream generating apparatus which is simple in structure and can be fabricated at an inexpensive cost.

The present invention provides a cool air stream generating apparatus which comprises a blower provided with a frame by which it is attached to the window of a building to be cooled for introducing an environmental air into the interior of the building therethrough; at least one water delivering tube detachably fitted to the frame of the blower; a pressurized water feeding tube connected to the water delivering tube; and one or a plurality of spray nozzles disposed on the water delivering tube in the spaced relationship for ejecting water in the interior of the building in the form of mist particles, the spray nozzles being located in front of the blower with a small gap or a short distance kept therebetween. It is preferable that in the front of the blower and somewhat ahead of the spray nozzle one or more one rod-shaped members are attached to the window frame. Both ends of the holders 10 are pivotally fitted with the water delivering tube 8 by tightening means 11.

It is preferable that the spray nozzles are fitted to the water delivering tube on the front side of the latter while orienting toward the interior of the building.

In addition, it is preferable that the water delivering tube is detachably fitted to the window frame for the blower.

Additionally, it is preferable that the suction side of the blower is kept open to the outside so as to allow an environmental air to be introduced into the interior of the building therethrough.

It is acceptable that a plurality of water delivering tubes are detachably annularly arranged in front of the blower while they are located in the concentrical relationship relative to each other.

It is also acceptable that a plurality of water delivering tubes are detachably arranged in front of the blower while extending in parallel with each other.

In addition, it is also acceptable that a plurality of water delivering tubes are detachably crosswise arranged in front of the blower while they are located in the equally spaced relationship as seen in the circumferential direction of the blower.

With such construction, the mist particles ejected from the spray nozzles in the forward direction are mixed with the air stream discharged from the blower, and subsequently, they are completely vaporized, causing the air stream to be effectively cooled by the latent heat of the mist particles appearing as the foregoing vaporization proceeds.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

The present invention will now be described in detail hereinafter with reference to the accompanying drawings which illustrate a preferred embodiment thereof.

Figure 1:
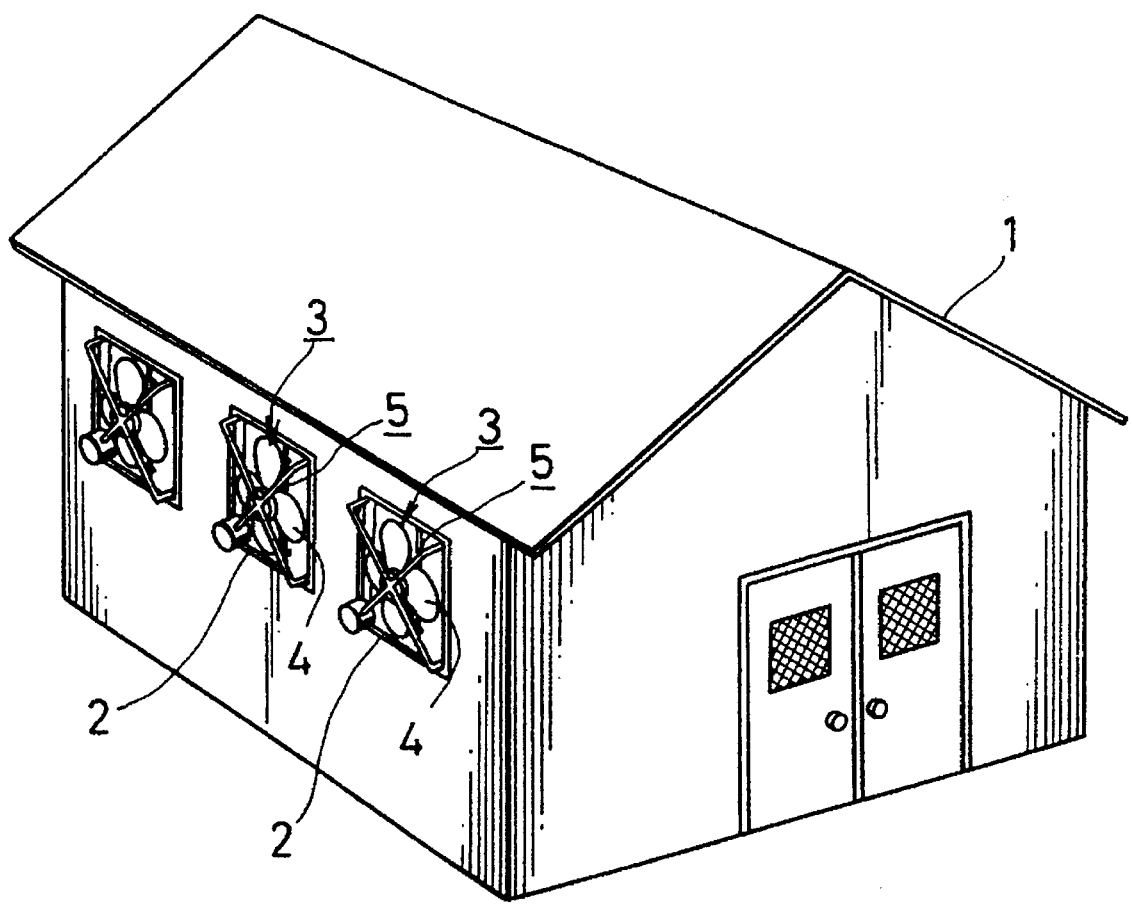
FIG. 1 is a perspective view of a chicken farming house including a plurality of cool air stream generating apparatuses each constructed in accordance with an embodiment of the present invention.
Figure 2:
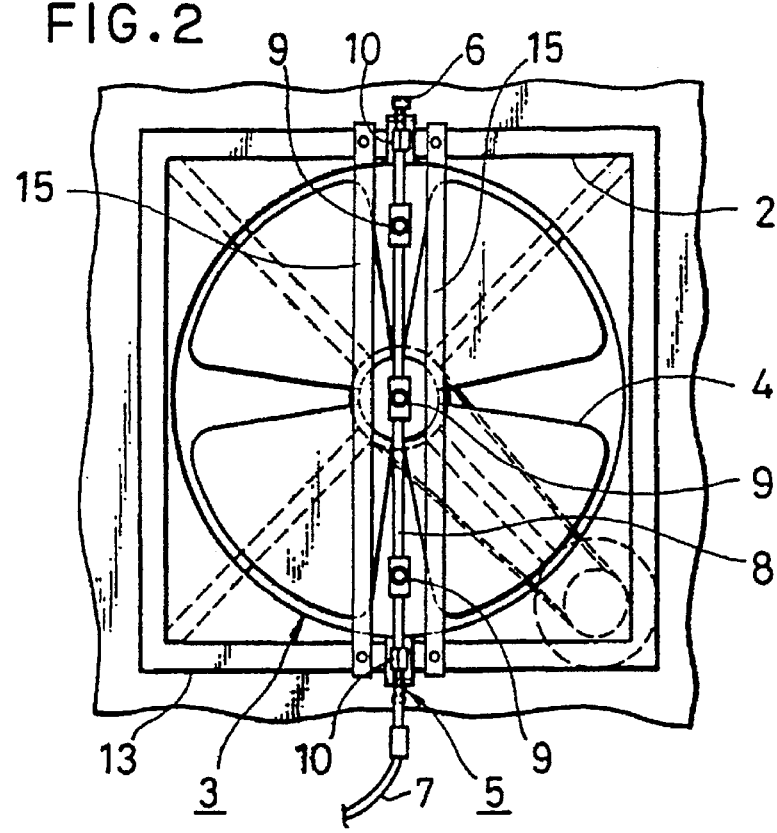
FIG. 2 is a front view of a cool air stream generating apparatus constructed in accordance with the embodiment of the present invention.
Figure 3:
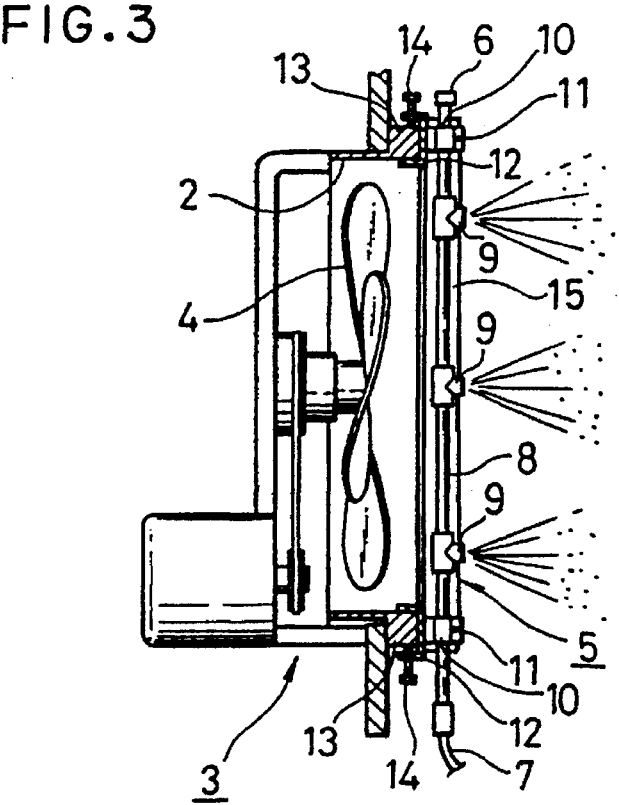
FIG. 3 is a sectional side view of the cool air stream generating apparatus as seen from the left-hand side of FIG. 2.

FIG. 1 shows by way of perspective view the case that a plurality of cool air stream generating apparatuses each constructed in accordance with the embodiment of the present invention are employed for a chicken farming house.

Referring to FIG. 1, a chicken farming house 1 includes a plurality of windows 2 to which one or a plurality of blowers 3 are rotatably attached.

Each blower 3 includes a fan 4, and a mist generating unit 5 is disposed in front of the fan 4 in the spaced relationship with a small gap or a short distance kept therebetween.

The mist generating unit 5 is substantially composed of a rod-shaped water delivering tube 8 and a plurality of conventional spray nozzles 9 (three spray nozzles in the shown case). The upper end 6 of the water delivering tube 8 is kept closed, while the lower end of the same is connected to a pressurized water feeding tube 7. As shown in the drawings, the spray nozzles 9 are located on the water delivering tube 8 in the equally spaced relationship. In addition, each of the spray nozzles 9 is fitted to the front side of the water delivering tube 8 and serves to distributively eject water therefrom in the form of mist particles in the forward direction.

In more detail, one holder 10 is disposed in the vicinity of the upper end of the water delivering tube 8, while other holder 10 is disposed in the vicinity of the lower end of the same. Both ends of the holders 10 are pivotally fitted to the water delivering tube 8 by supporting means 11, and moreover, they are firmly fitted to a window through a frame 13 of the blower 3 from the front side by using substantially U-shaped fitting members 12 and bolts 14.

In this embodiment, a single water delivering tube 8 is used for the cool air stream generating apparatus. Alternatively, a plurality of water delivering tube 8 may detachably crosswise be arranged in front of the blower 3 while they are located in the equally spaced relationship as seen in the circumferential direction of the blower 3. Otherwise, a plurality of water delivering tubes 8 may detachably be arranged in front of the blower 3 while extending in parallel with each other. The water delivering tube 8 should not be limited only to a linearly extending rod-shaped water delivering tube. For example, an annular water delivering tube may be substituted for the linearly extending rod-shaped water delivering tube.

In addition, a plurality of spray nozzles 9 may be disposed in front of the blower 3 using suitable fitting means without any necessity for disposing the water delivering tube 8. In this case, the pressurized water feeding tube 7 is connected directly to a water feeding port of each spray nozzle 9.

Any type of hitherto known spray nozzle can be employed for the cool air stream generating apparatus, provided that it is proven that it can form mist particles when water is distributively ejected therefrom. It is desirable that as water is ejected from the spray nozzle 9, the latter can form very fine mist particles, and moreover, a spraying speed and a spraying angle of the ejected water can be changed as desired.

In operation, a water ejecting port of each spray nozzle 9 is adequately adjusted such that very fine mist particles are formed with ejected water and each of a spraying speed and a spraying angle assumes an acceptable value. Thereafter, pressurized water is fed to the water delivering tube 8 and a fan 4 of the blower 3 is rotated, causing the water ejected from the spray nozzles 9 to be expansively distributed in the form of fine mist particles in the forward direction.

In addition, as the blower 3 is rotated, environmental air is introduced into the cool air stream generating apparatus, and it is blown from the blower 3 to merge with the mist particles.

As a result, the environmental air is forcibly mixed with the mist particles which in turn are vaporized, and further, in front of the frame of the window 2 two rod-shaped members 15 are provided nearly parallel with the water delivering tube 8 so that they may put it between them with a small space, and they serve to generate karman's vortex which can make the sprayed fine mist particles further finer. It results in facilitating vaporization of the mist particles, whereby the temperature of the environmental air is quickly reduced by the latent heat of the mist particles appearing as the foregoing vaporization proceeds, resulting in a cool air stream being blown in the chicken farming house 1.

Since the suction side of the blower 3 is kept open to the outside, there does not arise a malfunction that the interior of the chicken farming house 1 is excessively saturated with moisture, causing the mist particles to be incompletely or incorrectly vaporized. Thus, a cold air stream can reliably be obtained for a long time with the cold air stream generating apparatus.

The present invention has been described above with respect to the case that a plurality of blowers 3 each including a mist generating device 5 are firmly attached to the respective windows 2. Alternatively, each blower 3 assembled with a mist generating device 5 may be designed as a portable unit so as to enable it to be displaced to another location for practical use as desired.

Advantages of the cool air stream generating apparatus constructed in the above-described manner will be noted below.

(a) Since the latent heat appearing as mist particles are vaporized is utilized for the cold air stream generating apparatus, a cold air stream can be obtained by effectively cooling the environmental air without any necessity for maintaining the temperature of water to be fed to the water delivering tube to be held at a low level at all times.

(b) The cold air stream generating apparatus can easily be constructed by assembling any type of existent blower therewith without a necessity for specially modifying or remodelling the blower.

(c) Since the suction side of the blower is kept open to the outside, there is few possibility that the interior of a building to be cooled is excessively saturated with moisture. Thus, mist particles can continuously be vaporized at a high efficiency for a long time.

(d) Since the cold air stream generating apparatus is simple in structure, it can be fabricated at an inexpensive cost, and moreover, it can be operated at a low running cost with few possibility that it fails to be practically used for some reason.

While the present invention has been described above with respect to a single preferred embodiment thereof, it should of course be understood that the present invention should not be limited only to this embodiment but various change or modification may be made without any departure from the scope of the present invention as defined by the appended claims.

What is claimed is:

1. A cool air stream generating apparatus comprising:

a blower provided with a frame for being attached to a window of a building to be cooled for introducing environment air into an interior of said building therethrough;

a pressurized water feeding tube;

a spray nozzle disposed on said pressurized water feeding tube connected to a water delivering tube for ejecting water in the form of mist particles into the interior of said building, said water delivering tube being located on the interior side of said blower, and between said spray nozzle and said blower there being kept a small gap or a short distance; and said gap being formed by two rod-shaped members attached to said frame.

2. A cool air stream generating apparatus according to claim 1, wherein said spray nozzle is detachably fitted to said water delivering tube while orienting toward the interior of said building.

3. A cool air stream generating apparatus according to claim 1, wherein said water delivering tube is detachably and rotatably fitted to said frame of said blower.

4. A cool air steam generating apparatus according to claim 1, wherein the suction side of said blower is kept open to the outside so as to allow environmental air to be introduced into the interior of the building therethrough.

5. A cool air stream generating apparatus according to claim 1, wherein a plurality of water delivering tubes are detachably annualarly arranged near said blower while they are located in the concentrical relationship relative to each other.

6. A cool air stream generating apparatus according to claim 1, wherein said rod-shaped members are provided so that they may put said water delivering tube between themselves with small distances therebetween.

7. The cool air stream generating apparatus as claimed in claim 1, wherein a plurality of water delivering tubes are detachably arranged near said blower while extending in parallel with each other.

8. The cool air stream generating apparatus as claimed in claim 1, wherein a plurality of water delivering tubes are detachably crosswise arranged near said blower while they are located in the equally spaced relationship as seen in the circumferential direction of said blower.

9. A cool air stream generating apparatus comprising:

a blower provided with a frame for being attached to a window of a building to be cooled for introducing environment air therein;

a pressurized water feeding tube coupled to the blower;

a spray nozzle disposed on said pressurized water feeding tube for spraying fine water particles into the building, said spray nozzle disposed so as to enable the blower to disperse the fine water particles; and at least two rod-shaped members coupled to said frame for creating Karman's vortex.

* * * * *